United States Patent
Kotyk

Patent Number: 6,142,393
Date of Patent: Nov. 7, 2000

[54] CAP SEAL FOR LUBRICANT INJECTOR

[75] Inventor: Jeffrey M. Kotyk, St. Louis, Mo.

[73] Assignee: Lincoln Industrial Corporation, St. Louis, Mo.

[21] Appl. No.: 09/444,158

[22] Filed: Nov. 22, 1999

[51] Int. Cl.[7] .............................. F02M 59/00; B05B 1/28
[52] U.S. Cl. ...................... 239/533.2; 239/288; 277/465; 277/552; 277/928
[58] Field of Search .............................. 239/533.2, 533.3, 239/288, 288.5; 277/465, 552, 928

[56] References Cited

U.S. PATENT DOCUMENTS

| | | | |
|---|---|---|---|
| 2,358,719 | 9/1944 | Klein | 251/76 |
| 2,428,031 | 9/1947 | Mayes | 277/465 |
| 2,627,320 | 2/1953 | Rotter | 184/7 |
| 3,664,462 | 5/1972 | Smith, Sr. | 184/7 |
| 3,715,013 | 2/1973 | Lyth et al. | 184/7 |
| 3,958,725 | 5/1976 | Reeve | 222/335 |
| 5,126,722 | 6/1992 | Kamis | 340/606 |
| 5,169,162 | 12/1992 | Azaml | 277/465 |
| 5,265,808 | 11/1993 | Gordon et al. | 239/533.2 |

OTHER PUBLICATIONS

Lubriquip®, Centralized Lubrication Systems brochure, Trabon® Injecto–Flo System, Aug. 1994.

*Primary Examiner*—Andres Kashnikow
*Assistant Examiner*—David Hwu
*Attorney, Agent, or Firm*—Senniger, Powers, Leavitt & Roedel

[57] ABSTRACT

A cap assembly for covering an injector of a lubricant metering device to sealingly protect the injector from moisture and dirt. The injector has a generally cylindric body and an end structure narrower than the body projecting endwise from the body. The assembly has a cap including a generally cylindric tube having a side wall, an open end, a closed end and a configuration such that the cap is shaped and sized for detachable mounting on the body of the injector in a covering position in which the tube encloses the end structure of the injector. A flexibly resilient gasket has an annular shape with an inner edge sized for surrounding the end structure to enable the gasket to be sealingly secured to the structure and an outer edge sized for engaging an inner surface of the side wall of the cap and forming a fluid-tight seal thereon when the cap is mounted in its covering position. The gasket holds the cap in generally fixed position relative to the injector and further prevents passage of moisture or dirt therepast. The gasket has at least one notch in the outer edge for permitting passage of air through the notch to prevent build-up of air pressure in the cap as the cap is mounted on the injector.

18 Claims, 3 Drawing Sheets

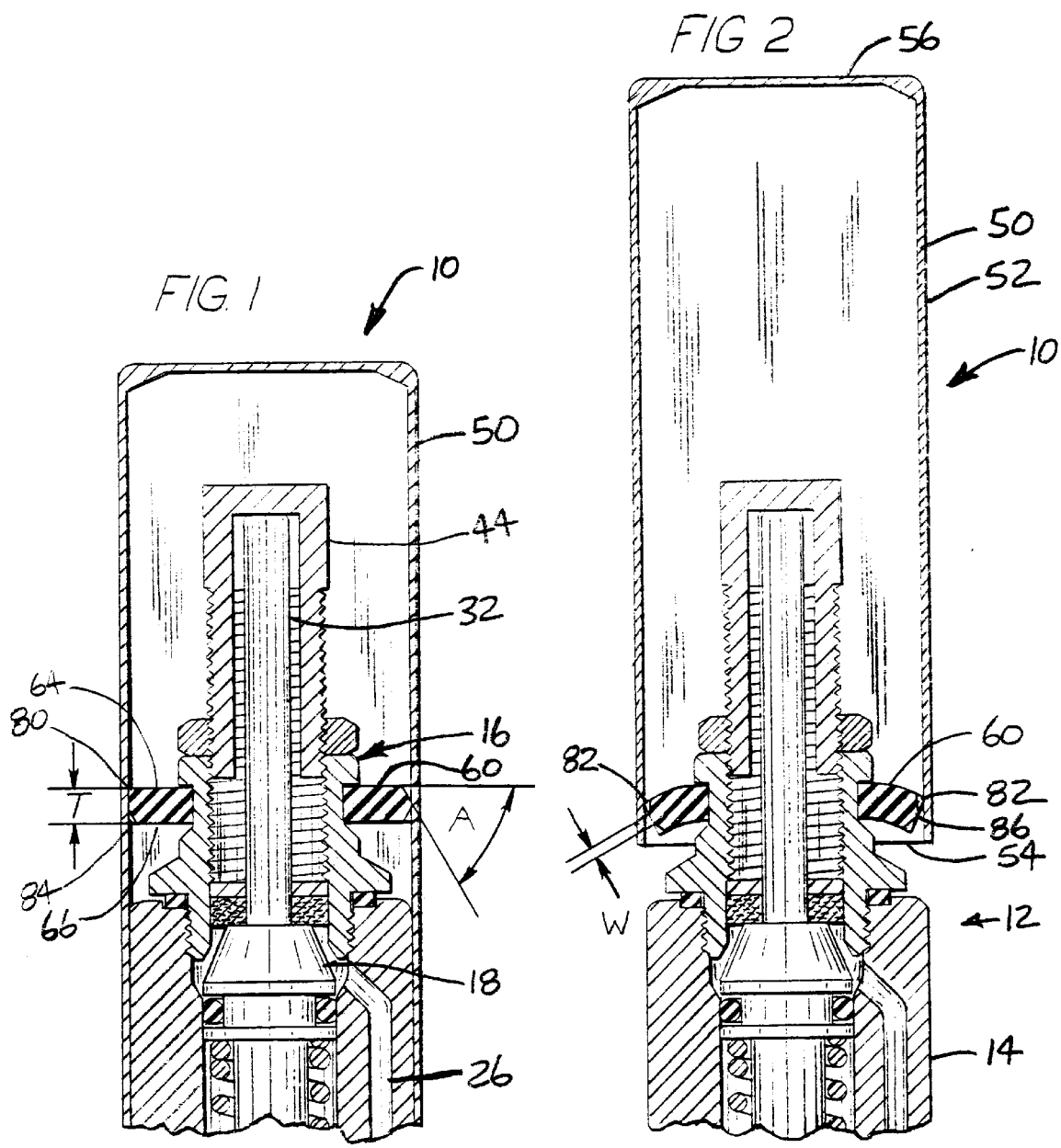

CAP SEAL FOR LUBRICANT INJECTOR

BACKGROUND OF THE INVENTION

This invention relates generally to metering devices for dispensing or injecting a quantity of lubricant, and in particular to a cap and seal assembly for protecting a metering device from moisture and dirt contamination.

Lubricant metering devices are used to deliver a quantity of oil or grease under pressure to lubrication points on machine tools, vehicles, and heavy equipment. One type of metering device has an injector with a generally cylindric body containing a spring-loaded, reciprocal piston. The device dispenses an accurate amount of lubricant when the piston reciprocally moves in response to pressure variations in a lubricant supply line. These injectors typically have an adjusting screw for controlling the quantity of lubricant dispensed and an indicator pin connected to the piston for providing visual indication of injector operation. The adjusting screw and indicator pin are both located on a narrowed end structure of the injector that projects from an end of the body.

Lubricant metering devices are susceptible to failure when moving parts become contaminated with moisture or dirt. Injectors are frequently grouped in manifold assemblies that are remotely mounted on the machine tools, positioned near the lubrication points that they serve. These injectors encounter difficult environments, including wide temperature variations, exposure to dust particles, and partial immersion in mud or water. Dirt contamination in the end structure inhibits operation of the adjusting screw and indicator pin. Moisture contamination causes corrosion that eventually ruins the injector.

To protect the end structure from dirt and moisture, some injectors incorporate a detachable cap that is placed over the end structure and encloses the adjusting screw and indicator pin. A lower rim of the cap circumferentially engages the injector body. Unfortunately, the rim of the cap does not provide a fluid-tight sealing contact against the injector body. Moisture may freely reach the end structure even when the cap is in place, leaving injectors susceptible to corrosion. It has not previously been found practical to seal the cap because when the cap is placed over the end structure, any seal tends to trap air within the cap and causes a build-up of air pressure which inhibits motion of the cap to its proper position.

Another drawback is that the cap is prone to fall off the injector, especially when the injector is moved to an inverted orientation. To avoid this, some caps have been modified to tightly grip the injector body with a press fit at the cap's rim. However, injector bodies exhibit small non-uniformities in size due to manufacturing tolerances, and each modified cap typically fits only one injector and at one angular position. Thus modified caps lack interchangeability with other caps, substantially degrading their usefulness.

SUMMARY OF THE INVENTION

Among the several objects and features of the present invention may be noted the provision of a cap assembly for a lubricant injector of the type described above that sealingly protects the injector against contamination of dirt or moisture; the provision of such a cap assembly that includes a detachable cap that may be interchangeably used on various injectors; the provision of such a cap assembly which is economical to manufacture; the provision of such a cap assembly which is reliable in operation; and the provision of a seal used in such a cap assembly.

A cap assembly of the present invention for covering an injector of a lubricant metering device sealingly protects the injector from moisture and dirt. The injector has a generally cylindric body and an end structure narrower than the body projecting endwise from the body. The assembly comprises a cap comprising a generally cylindric tube having a side wall, an open end, a closed end and a configuration such that the cap is shaped and sized for detachable mounting on the body of the injector in a covering position in which the tube encloses the end structure of the injector. A flexibly resilient gasket has an annular shape with an inner edge sized for surrounding the end structure to enable the gasket to be sealingly secured to the structure and an outer edge sized for engaging an inner surface of the side wall of the cap and forming a fluid-tight seal thereon when the cap is mounted in its covering position. The gasket holds the cap in generally fixed position relative to the injector and further prevents passage of moisture or dirt therepast.

In another aspect, the present invention involves an improved lubricant metering device comprising one or more injectors. Each injector comprises a body containing a reciprocal piston for dispensing lubricant from the body, an indicator pin structure connected to the piston and extending endwise from the body for providing visual indication of piston motion, and a detachable cup-shaped cap for covering the indicator pin structure. The improvement comprises a flexible resilient seal captured on the indicator pin structure having an annular shape with an inner edge sized for surrounding the structure to form a fluid-tight seal against the structure, and an outer edge sized for engaging an inner surface of the cap to form a fluid-tight seal thereon when the cap covers the indicator pin structure.

In yet another aspect, a gasket of the present invention releasably holds a cup-shaped cap on an end structure of a lubricant metering device and forms a seal between the cap and the end structure to prevent moisture or dirt contamination. The lubricant metering device has a generally cylindric body with the end structure projecting endwise from the body. The gasket comprises a washer of a flexibly resilient material having an annular shape with a top surface, a bottom surface, an inner edge and an outer edge. The washer is sized for placement on the end structure of the device so that the washer surrounds the end structure and the inner edge forms a fluid-tight seal thereon. The top surface faces generally away from the body and the bottom surface faces generally toward the body. The washer is further sized so that the outer edge engages an inner surface of the cap when the cap is received on the end structure to form a fluid-tight seal against the inner surface and hold the cap in generally fixed position relative to the washer. The washer is resiliently flexible between an undeflected position wherein the washer has a generally flat profile and the outer edge is generally aligned with the inner surface of the cap when the cap is mounted on the end structure, and a deflected position wherein the washer has a curved profile and the outer edge is not aligned with the inner surface of the cap. A first notch is formed in the outer edge of the washer, the notch being a beveled notch extending between the outer edge and the top surface. The notch is positioned so that the washer in the deflected position is unsealed and permits passage of air through the notch to prevent build-up of air pressure in the cap as the cap is mounted on the end structure.

Other objects and features of the present invention will be in part apparent and in part pointed out hereinafter.

BRIEF DESCRIPTION OF THE DRAWINGS

FIG. 1 is a sectional view of an upper portion of an injector of a lubricant metering device having a cap and seal of the present invention, with the cap being shown mounted on the injector and the seal being shown in an undeflected position;

FIG. 2 is a sectional view similar to FIG. 1 illustrating mounting the cap on the injector, the seal being shown in a deflected position;

Corresponding reference characters indicate corresponding parts throughout the views of the drawings.

DETAILED DESCRIPTION OF THE PREFERRED EMBODIMENT

Figure 3:
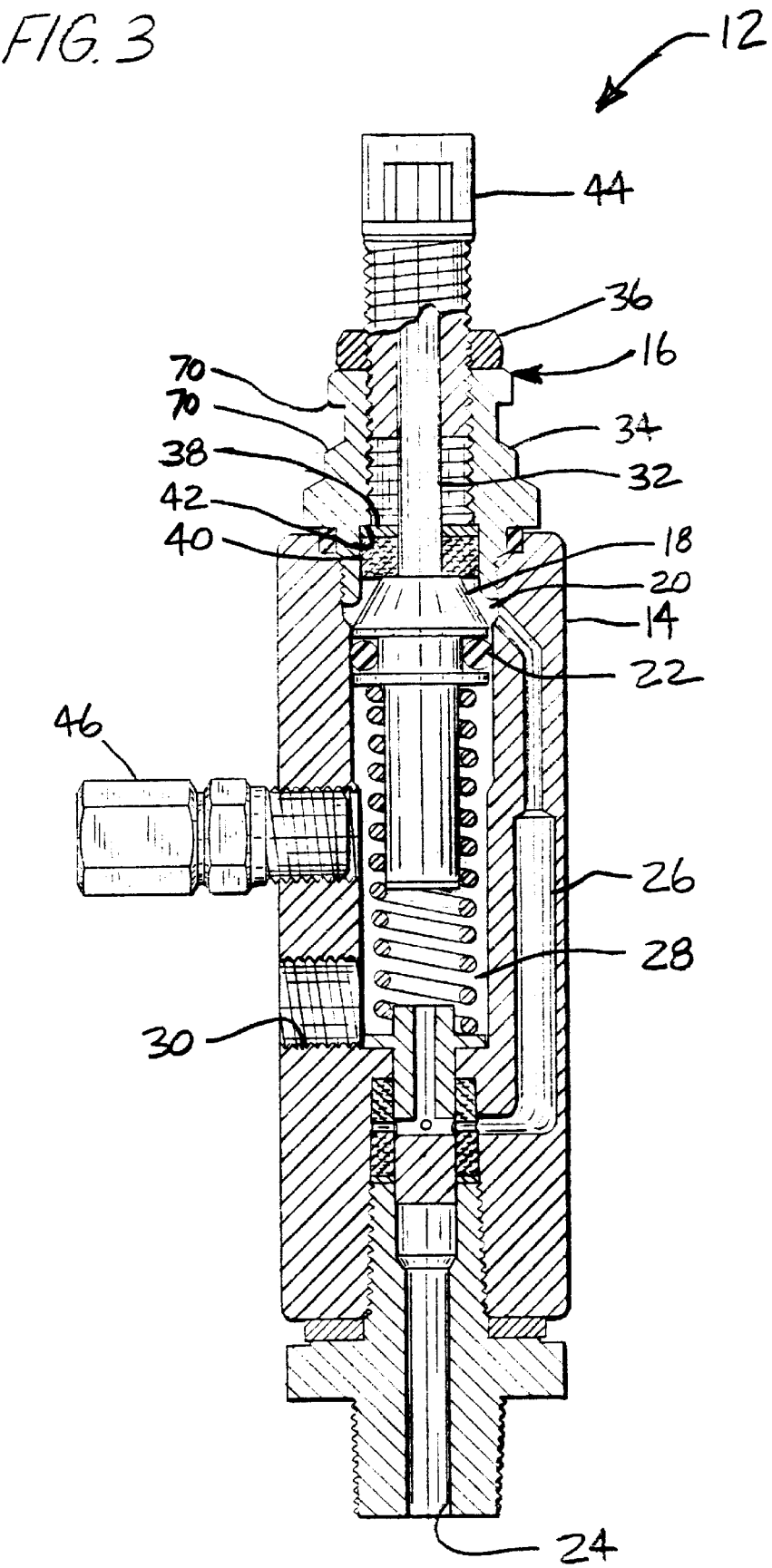
FIG. 3 is a sectional view of an injector without a cap or seal.

Referring now to the drawings and in particular to FIG. 1, a cap assembly of the present invention for covering an injector of a lubricant metering device is indicated generally at 10. The metering device is of a type comprising one or more injectors indicated generally at 12. As shown in FIG. 3, each injector has a generally cylindric body 14 and a narrower end structure indicated generally at 16 that projects from an end of the body.

The injector 12 contains a spring-loaded piston 18 that reciprocates in a measuring chamber 20 within the body for metering and dispensing lubricant. An O-ring 22 encircles the piston 18 to provide a fluid-tight seal against walls of the measuring chamber 20. Pressurized lubricant from a supply line 24 travels through a passage 26 into the measuring chamber. With each stroke of the piston 18, a measured quantity of lubricant is forced into a discharge chamber 28 for exit from the injector through an outlet port 30. An indicator pin 32 is connected to the piston 18 and extends from the body 14 into the end structure 16, where the pin is plainly visible to an operator. The pin 32 provides visual indication of piston motion for detecting potential failures of injector operation. The end structure 16 has a piston stop plug 34 mounted on an end of the injector body 14, the stop plug being secured by a lock nut 36. A washer 38 and packing 40 are positioned against an inner shoulder 42 of the stop plug. The end structure 16 also includes a rotatable adjusting screw 44 for adjusting the stroke of the piston 18 to control the quantity of lubricant dispensed. A fitting 46 is provided as an alternate source for supplying lubricant to the injector 12 at times when the piston 18 is not operating properly.

Because the injector 12 of the lubricant metering device is conventional, it will not be described in further detail.

The cap assembly 10 of the present invention sealingly protects the end structure 16 of the injector from moisture or dirt contamination. The assembly includes a detachable cup-shaped cap 50 in the form of a generally cylindric tube with a side wall 52, an open end 54, and a closed end 56. The cap 50 is shaped and sized for mounting on the body 14 of the injector 12. When it is mounted in a covering position, as shown in FIG. 1, the cap 50 encloses the end structure 16. The cap 50 is made of a rigid material such as aluminum. In the preferred embodiment, the cap has an inner diameter of between about 1.187 and 1.193 inches.

Figure 4:
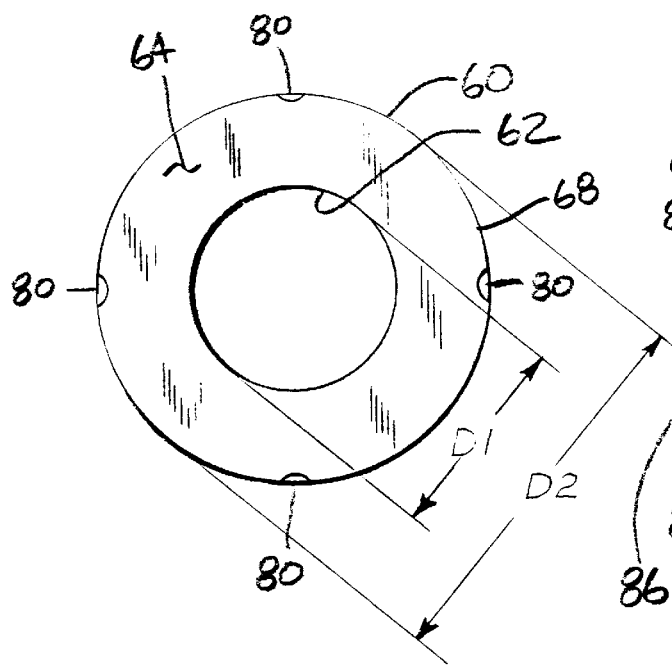
FIG. 4 is an end view of the seal.
Figure 5:
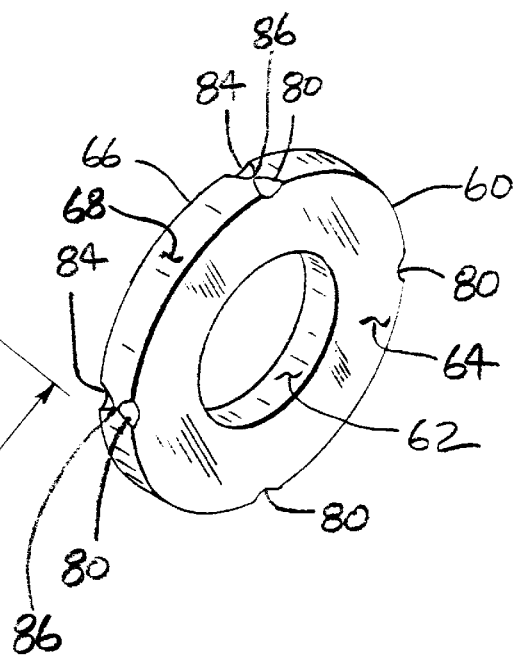
FIG. 5 is a perspective view of the seal.

The assembly 10 also includes a flexibly resilient gasket 60, or washer, for holding the cap 50 in generally fixed position relative to the injector 12 and preventing passage of moisture or dirt therepast. As shown in FIGS. 4 and 5, the gasket 60 has an annular shape. An inner edge 62 is sized for tightly surrounding the piston stop plug 34 and forming a fluid-tight seal thereon. The gasket 60 has a top surface 64 facing generally away from the body 14 of the injector and a bottom surface 66 facing generally toward the body. An outer edge 68 is shaped and sized for engaging an inner surface of the side wall 52 of the cap and forming a fluid-tight seal thereon. The gasket 60 is positioned between shoulders 70 on an outer surface of the stop plug 34 (FIG. 1), so that the gasket is generally captured on the end structure 16. The gasket 60 remains at that position whether the cap 50 is either mounted or detached. When the cap 50 is mounted in its covering position of FIG. 1, the gasket 60 generally holds the cap in position on the end structure 16, even when the injector 12 is inverted and gravity tends to remove the cap. Further, the gasket 60 prohibits passage of contaminants into the closed end 56 of the cap and thereby protects the end structure 16.

The gasket 60 is resiliently flexible between an undeflected position (FIG. 1) and a deflected position (FIG. 2). In the undeflected position, the gasket has a generally flat profile and the outer edge 68 is generally aligned with and in sealing engagement with the inner surface of the side wall 52 when the cap is in its covering position. In the deflected position, the gasket 60 has a curved profile and the outer edge 68 is not aligned with nor in sealing engagement with the inner surface of the side wall 52. The gasket 60 is flexed between the deflected and undeflected positions by a sliding motion of the cap 50 toward the body 14 of the injector 12, as illustrated in FIG. 2.

The gasket 60 is constructed for providing reliable operation and a long service life. The gasket is made of one piece of a material that is resiliently flexible over a fairly wide range of temperatures. In the preferred embodiment, the gasket 60 is made of nitrile rubber, which maintains resiliency to temperatures as low as about 0° Fahrenheit. It is dimensioned to be relatively thick and sturdy. In the preferred embodiment, the gasket 60 has a thickness T between about 0.145 and 0.155 inch, with an inner diameter D1 between about 0.615 and 0.625 inch and an outer diameter D2 between about 1.193 and 1.203 inches (FIG. 4). These dimensions provide for an interference fit against the inner surface of the cap 50, as the outer diameter D2 is about 0.008 inch larger than the inside diameter of the cap. The gasket 60 also has an interference fit against the piston stop plug 34, as the inner diameter D1 is about 0.010 inch smaller than an outer diameter of the piston stop plug (which is between about 0.627 and 0.633 inch). Interference fits at both inner and outer edges 62, 68, respectively, provide for fluid-tight sealing on piston stop plugs and caps, and permit interchangeability on various caps and piston stop plugs that have non-uniformities in size due to manufacturing tolerances. Gaskets having other sizes, thicknesses, and material constructions do not depart from the scope of this invention.

As shown in FIGS. 1, 2, 4 and 5, the gasket 60 is recessed adjacent its outer edge 68 for permitting the passage of air therepast when the gasket flexes to the deflected position as the cap is mounted on the injector. In the preferred embodiment, a first set of four upper notches 80 is formed in the top surface 64 of the gasket adjacent its outer edge 68 at equally spaced intervals (e.g., 90 degree intervals) around the gasket. It is understood that there may be one notch 80 or any number of separate notches at any spacing without departing from the scope of this invention. Each notch 80 is beveled between the outer edge 68 and the top surface 64 of the gasket 60 and positioned so that the gasket in the deflected position is unsealed. As seen in FIG. 2, a passageway 82 is formed at each notch 80 between the gasket 60 and the cap 50 that permits passage of air through the notch and prevents build-up of air pressure in the cap as the cap is mounted on the injector 12. The notches 80 are collectively sized so that the passageways 82 have sufficient flow area to permit a volume of air to exit the cap 50 rapidly enough so that the cap may be readily mounted on the injector without resistance from build-up of air pressure in the cap.

In the preferred embodiment, each notch 80 is arcuate in cross-section, having rounded bottom and side surfaces progressively decreasing in width from the top surface of the gasket to its outer edge. Notches of other shapes would work equally as well, provided that when the gasket 60 is undeflected the notch allows the gasket to seal against the cap 50 and does not permit air to flow therepast, but when the gasket is deflected the notch permits air to flow therepast. Each notch 80 may be narrow, extending only along a small circumferential extent around the gasket 60, or may comprise a lengthy recess that extends around a substantial portion of the outer edge 68. For the preferred embodiment, each of the upper four notches 80 has a width at the top surface 64 of the gasket of between about 0.095 and 0.100 inches, and the bottom of the notch extends at an angle A of about 65 degrees with respect to the top surface 64 of the gasket (see FIG. 1). The arcuate cut of each notch 80 has a radius of between about 0.055 and 0.065 inch. Notches having other shapes or dimensions do not depart from the scope of this invention.

As shown in FIGS. 1 and 5, the gasket 60 is also recessed adjacent its outer edge 68 on the bottom surface 66 for permitting the gasket to be oriented with either the top or bottom surface facing away from the body 14 of the injector 12. In the preferred embodiment, a second set of four lower notches 84 is formed in the bottom surface 66 of the gasket adjacent it outer edge at equally spaced intervals around the gasket. Each notch 84 is beveled between the outer edge 68 and the bottom surface 66 of the gasket. As shown in FIG. 5, each lower notch 84 corresponds in size and location to an upper notch 80 so that the bottom surface 66 of the gasket is substantially the same as the top surface 64. It will be understood, however, that the lower notches 84 need not correspond in size and location with the upper notches 80. Also, there may be one lower notch 84 or any number of separate lower notches at any spacing without departing from the scope of the invention.

If the upper and lower notches 80, 84, respectively, are at corresponding locations as shown in FIG. 5, they should be sized so that the two notches of each pair of opposing upper and lower notches are separated by a sealing portion 86 of the outer edge 68 which is unrecessed. In the preferred embodiment, the sealing portion 86 has a width W (FIG. 2) of between about 0.015 and 0.025 inch. It will be observed that the lower notches 84 are not necessary for proper operation of the present invention, but they are preferred because they enable the gasket 60 to be mounted in an opposite orientation with the top and bottom surfaces 64, 66 reversed. Also, when a cap 50 is removed from the injector 12, the lower notches 84 permit air to flow therepast to prevent formation of a vacuum air pressure in the cap.

In operation, the gasket 60 is first mounted on the end structure 16 of a bare injector 12 of the type shown in FIG. 3. An operator carefully stretches the gasket while fitting it over the lock nut 36 and one of the shoulders 70 of the piston stop plug 34 until it becomes captured on the end structure with the inner edge 62 of the gasket forming a fluid-tight seal against the stop plug. Because the gasket 60 of the preferred embodiment has notches 80, 84 in its top and bottom surfaces, the gasket may be mounted with either side facing outwardly (e.g., up or down). The cap 50 is next mounted on the body 14 of the injector. As the cap slides over the gasket 60, the gasket is deflected as shown in FIG. 2 so that the sealing portion 86 of its outer edge 68 is not aligned with the side wall 52 of the cap (i.e., the sealing portion is disposed at an angle relative to the side wall and thus out of sealing engagement with the side wall). This permits air within the cap 50 to escape through the first set of notches (the upper notches 80 as shown in FIG. 2) as the cap is progressively slid over the gasket and injector, thereby avoiding the build-up of air in the cap to any pressure greater than an ambient level. Consequently, placement of the cap 50 on the injector 12 is greatly facilitated.

After moving the cap 50 to its covering position, the operator should make certain that the gasket 60 snaps back to its undeflected position. If the gasket fails to do so due to its own resilient properties, the operator should slide the cap 50 further toward the injector body 14 a small distance to a position just slightly beyond the covering position. The operator then slides the cap 50 back to its proper position in order to flex the gasket 60 from its deflected position back to an undeflected position. The cap assembly 10 is then sealed as shown in FIG. 1 with the sealing portion 86 of an outer edge 68 aligned with and sealingly engaging the side wall 52 of the cap so that the passageway 82 at each notch is closed. With the cap in position, the injector 12 may be safely exposed to dirt, mud, and moisture without the working parts on the end structure 16 becoming contaminated. If the injector is moved to an inverted orientation, the gasket will hold the cap in position. Thus the cap 50 will not fall off and there is no need to modify or deform the cap to retain it on the injector body 14. The cap is readily removable from the end structure when the adjusting screw 44 needs adjustment or when the operator needs to observe the indicator pin 32 to check for normal operation of the injector. When several caps 50 are removed, they may be interchangeably replaced on any injector because each gasket is similarly sized and will seal against any cap.

In view of the above, it will be seen that the several objects of the invention are achieved and other advantageous results obtained.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A cap assembly for covering an injector of a lubricant metering device to sealingly protect the injector from moisture and dirt, said injector having a generally cylindric body and an end structure narrower than the body projecting endwise from the body, the assembly comprising:

a cap comprising a generally cylindric tube having a side wall, an open end, a closed end and a configuration such that the cap is shaped and sized for detachable mounting on the body of the injector in a covering position in which the tube encloses the end structure of the injector; and a flexibly resilient gasket having an annular shape with an inner edge sized for surrounding the end structure to enable the gasket to be sealingly secured to the structure and an outer edge sized for engaging an inner surface of the side wall of the cap and forming a fluid-tight seal thereon when the cap is mounted in its said covering position, said gasket holding the cap in generally fixed position relative to the injector and further preventing passage of moisture or dirt therepast.

2. The cap assembly as set forth in claim 1 wherein the gasket is resiliently flexible between an undeflected position wherein the gasket has a generally flat profile and the outer edge is generally aligned with and in sealing engagement with the inner surface of the side wall of the tube when the cap is in its covering position, and a deflected position wherein the gasket has a curved profile and the outer edge is not aligned with or in sealing engagement with the inner surface of the side wall.

3. The cap assembly as set forth in claim 2 wherein the gasket is flexed between said deflected and undeflected positions by sliding motion of the cap relative to the body of the injector.

4. The cap assembly as set forth in claim 2 further comprising at least one notch in the outer edge of the gasket positioned so that the gasket in the deflected position is unsealed and permits passage of air through the notch to prevent build-up of air pressure in the cap as the cap is mounted on the injector.

5. The cap assembly as set forth in claim 4 further comprising a plurality of notches spaced at intervals around the gasket.

6. The cap assembly as set forth in claim 4 wherein said at least one notch is a beveled notch.

7. The cap assembly as set forth in claim 6 wherein the gasket has a top surface facing generally away from the body of the injector when the gasket is secured to the end structure and a bottom surface facing generally toward the body, and said at least one notch is a beveled notch extending between the outer edge and said top surface.

8. The cap assembly as set forth in claim 7 wherein said at least one notch comprises a first notch and further comprising a second notch generally opposite to said first notch, said second notch being in the outer edge of the gasket and extending in bevel between the outer edge and the bottom surface of the gasket, the second notch permitting the gasket to be oriented on the end structure with alternatively either the top surface or bottom surface facing toward the body.

9. The cap assembly as set forth in claim 8 further comprising a plurality of first notches spaced at intervals around the gasket and a plurality of second notches spaced at intervals around the gasket.

10. The cap assembly as set forth in claim 9 wherein there are equal number of said first notches and said second notches.

11. The cap assembly as set forth in claim 10 wherein said second notches are located around the gasket at positions corresponding with said first notches.

12. In a lubricant metering device comprising one or more injectors, each injector comprising a body containing a reciprocal piston for dispensing lubricant from the body, an indicator pin structure connected to the piston and extending endwise from the body for providing visual indication of piston motion, and a detachable cup-shaped cap for covering the indicator pin structure, the improvement comprising:

a flexible resilient seal captured on the indicator pin structure having an annular shape with an inner edge sized for surrounding said structure to form a fluid-tight seal against said structure, and an outer edge sized for engaging an inner surface of the cap to form a fluid-tight seal thereon when the cap covers the indicator pin structure.

13. The improvement as set forth in claim 12 wherein said outer edge of the seal is recessed for permitting the passage of air therepast when the seal flexes to a deflected position as it engages the cap.

14. The improvement as set forth in claim 12 further comprising at least one notch in said outer edge of the seal.

15. A gasket for releasably holding a cup-shaped cap on an end structure of a lubricant metering device and for forming a seal between the cap and the end structure to prevent moisture or dirt contamination, said lubricant metering device having a generally cylindric body with said end structure projecting endwise from the body, the gasket comprising:

a washer of a flexibly resilient material having an annular shape with a top surface and a bottom surface, an inner edge and an outer edge, the washer being sized for placement on the end structure of the device so that the washer surrounds the end structure and the inner edge forms a fluid-tight seal thereon, the top surface facing generally away from the body and the bottom surface facing generally toward the body, the washer further being sized so that the outer edge engages an inner surface of the cap when the cap is received on the end structure to form a fluid-tight seal against the inner surface and hold the cap in generally fixed position relative to the washer, the washer being resiliently flexible between an undeflected position wherein the washer has a generally flat profile and said outer edge is generally aligned with the inner surface of the cap when the cap is mounted on the end structure, and a deflected position wherein the washer has a curved profile and said outer edge is not aligned with the inner surface of the cap; and a first notch on said outer edge of the washer, the notch being a beveled notch extending between said outer edge and said top surface, the notch being positioned so that the washer in the deflected position is unsealed and permits passage of air through the notch to prevent build-up of air pressure in the cap as the cap is mounted on the end structure.

16. The gasket as set forth in claim 15 wherein the gasket is flexed between said deflected and undeflected positions by sliding motion of the cap relative to the end structure of the device.

17. The gasket as set forth in claim 16 further comprising a plurality of notches spaced at intervals around said outer edge of the washer.

18. The gasket as set forth in claim 16 further comprising a second notch generally opposite the first notch, said second notch being beveled between said outer edge and the bottom surface, the notch permitting the washer to be oriented on the end structure with alternatively either the top surface or bottom surface facing generally toward the body of the device.

* * * * *